Dec. 5, 1933.   E. A. ROCKWELL   1,938,195
POWER BRAKE MECHANISM
Filed Aug. 19, 1929   2 Sheets-Sheet 1

Inventor
Edward A. Rockwell,
By Wilkinson Huxley Byron & Knight
Attys.

Dec. 5, 1933.　　　　　E. A. ROCKWELL　　　1,938,195
POWER BRAKE MECHANISM
Filed Aug. 19, 1929　　　2 Sheets-Sheet 2
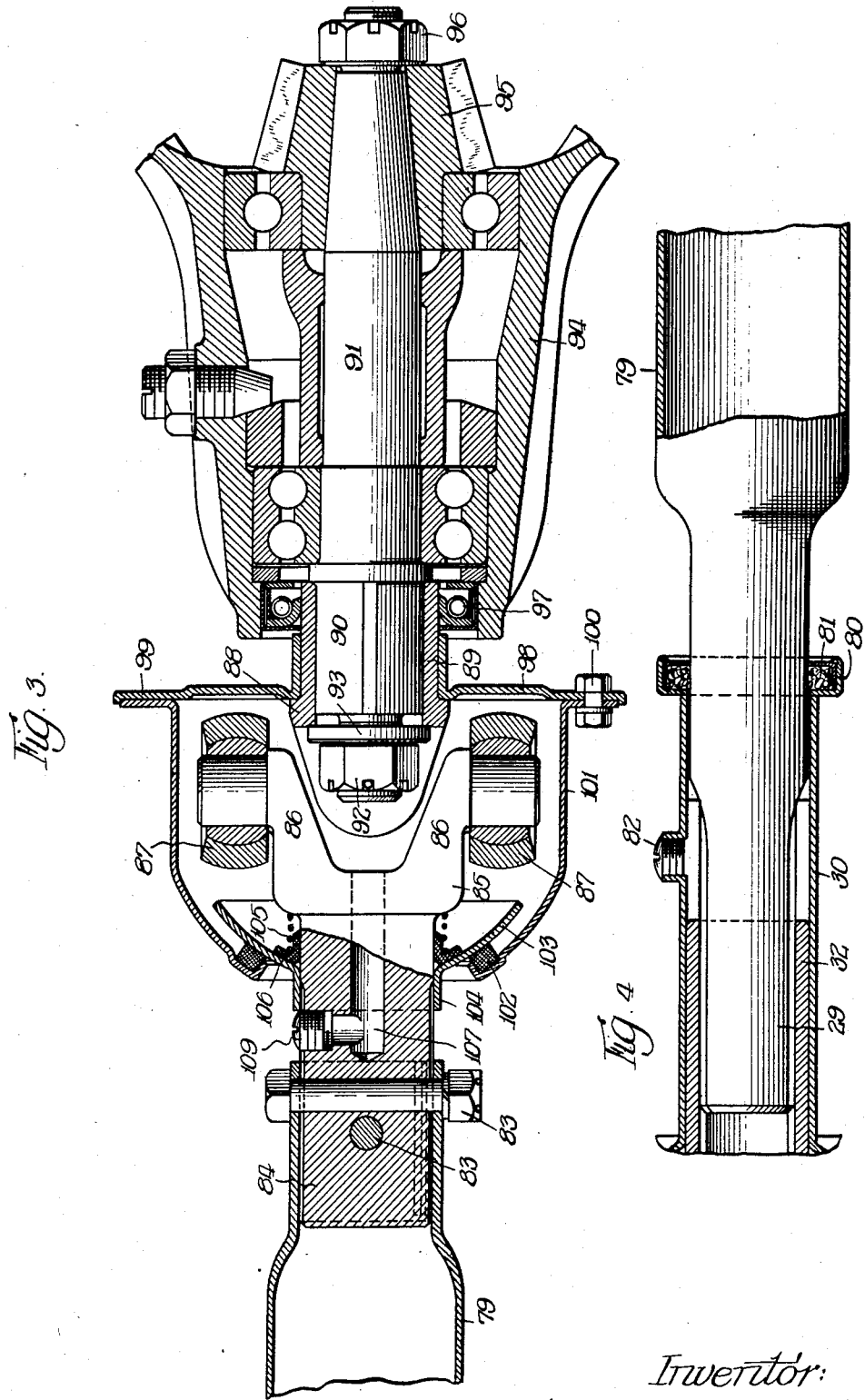
Inventor:
Edward A. Rockwell,
By Wilkinson Huxley Byron & Knight
Attys.

Patented Dec. 5, 1933

1,938,195

UNITED STATES PATENT OFFICE 1,938,195

POWER BRAKE MECHANISM

Edward A. Rockwell, Chicago, Ill.

Application August 19, 1929. Serial No. 386,747

10 Claims. (Cl. 188—140)

This invention relates to improvements in power brake mechanism combined with a vehicle drive construction and principally relates to a construction of a power brake unit which may be readily associated with standard types of vehicles immediately in the rear of the transmission housing whereby the transmission shaft extends through the power brake unit, connects to a universal joint and transmits the power to the vehicle at the rear end.

It is preferable to provide a lubricating housing for the universal joint connection and, therefore, in the present improvements a particular feature consists in connecting the housing of the universal joint directly to the rotating brake drum of the power brake unit. The housing is sealed by cooperating with a spring-pressed sleeve which surrounds the rearwardly extending socketed portion of one of the universal yoke members.

It is another feature of the present improvement to form the rear end connection in substantially the same manner whereby the parts may be standardized. Thus the rear end universal joint is enclosed by a similar housing.

It is another purpose of the present invention to provide generally improved details of construction of the power brake unit whereby the assembly, operation and replacement of parts is made relatively more simple.

Additional and further objects and advantages of the present improvements will be more readily apparent from the following description taken in connection with the preferred embodiment shown in the accompanying drawings in which—

Figure 3 is a vertical section on the plane of Figure 1 illustrating an extension of the drive connections.

Figure 4 is a vertical section taken longitudinally of the drive shaft and illustrating the rear and universal joint connection adjacent the differential housing.

Figure 1:
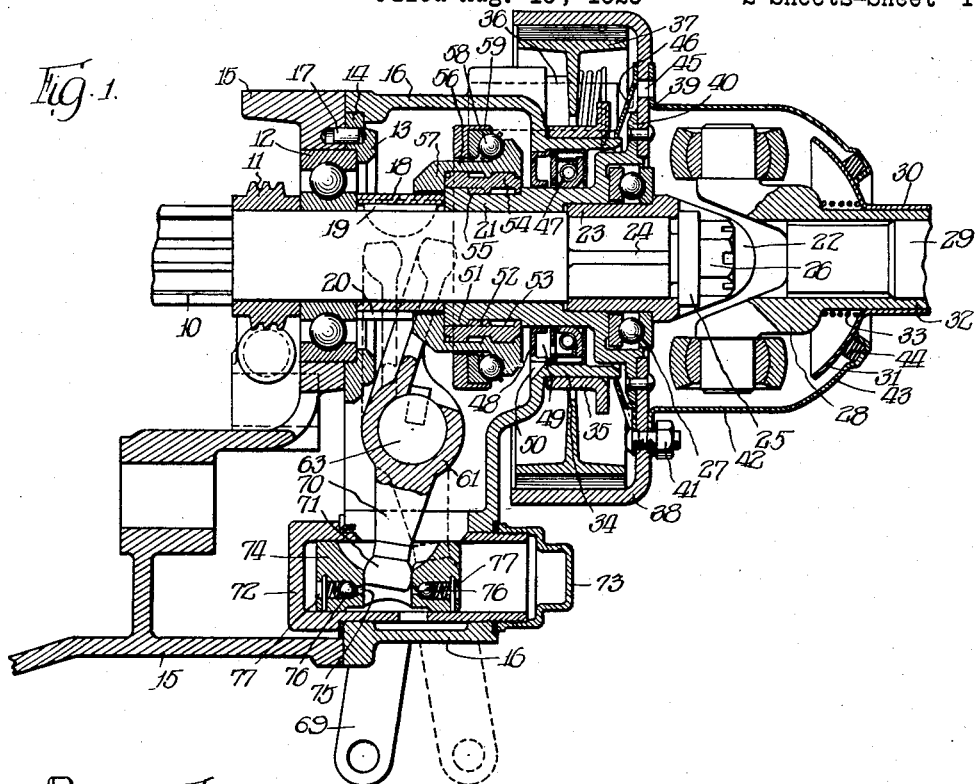
Figure 1 is a vertical section taken longitudinally of the drive shaft through the power brake unit and illustrating one of the universal joint connections.
Figure 2:
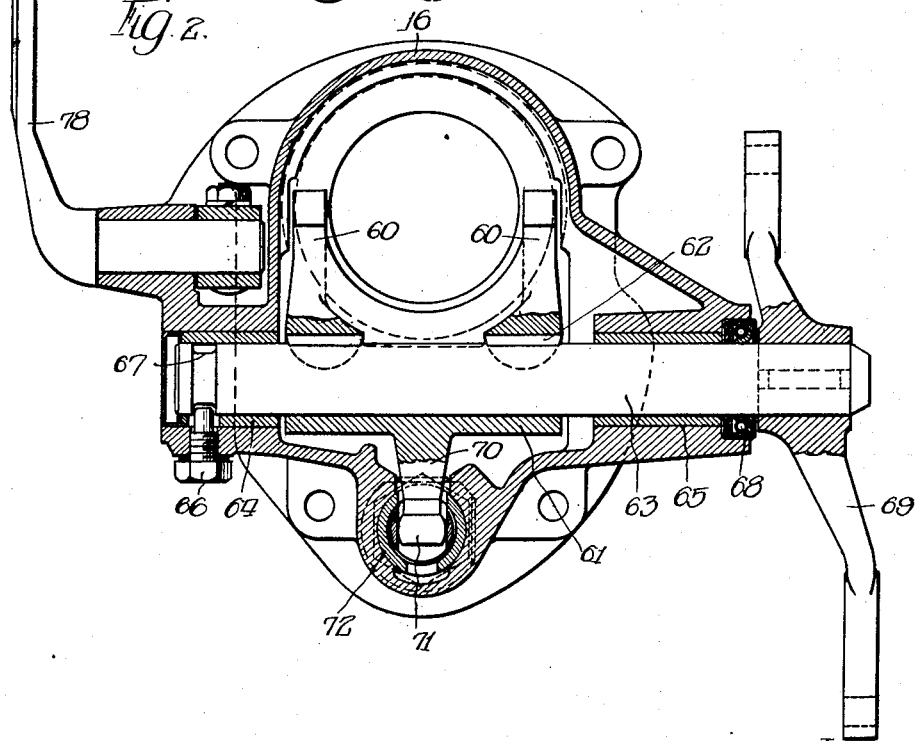
Figure 2 is a vertical section taken transverse to the power shaft through the power brake unit illustrated in Figure 1 and looking toward the forward end.

The transmission shaft 10 has mounted thereon the customary speedometer worm 11 and rearward of said worm is provided a journal bearing 12. A retainer ring 13 for the bearing is formed with a stepped edge 14 whereby it is securely held between the transmission housing 15 and the brake housing 16. A pin 17 holds the ring 13 against rotation. A spacing sleeve 18 bears against the rearward side of the journal bearing and is rotatively secured to the shaft by the key 19. The spacing sleeve is formed with splines on its outer surface indicated at 20. The rearward end of the spacing sleeve bears against the forward end of a sleeve 21 which is freely rotatable on the shaft 10. The shaft 10 is slightly reduced at its rearward end to form a bearing edge for a yoke 22 having a collar 23 that is keyed to the shaft by the splines 24 and is held in place by a washer 25 and nut 26. The nut 26 is screw-threaded to the end of the shaft 10. A thrust bearing 27 is secured between flanges of the sleeve 21 and collar 23. It will be noted that the sleeve 21 is enlarged for a portion at its rearward end to receive the collar 23. The yoke 22 is secured in the usual manner to a yoke 28 to form a universal joint, while the yoke 28 is splined to the spindled end of the tubular drive shaft 29 which extends to the differential housing. A housing tube 30 having a spherically enlarged forward end 31 encloses the rearwardly extending sleeve 32 of the yoke 28.

The tube 30 is rearwardly pressed by the spring 33. The brake housing 16 has formed therewith a rearwardly extending annular flange 34 forming a seat for the ring 35 which is the operating member for pressing the brake shoes outwardly.

The particular construction and mounting of the brake shoes is immaterial so far as the present improvements are concerned but there is shown a stub pivot bearing 36 extending from the brake housing 16 forming a support for a brake shoe 37 and a holding spring. The brake shoes are disposed to expand against a brake drum 38 which has its inwardly extending flange 39 riveted or otherwise secured to a flange 40 of the sleeve 21. To the drum 38 is attached, by bolt and nut connections 41, a dust cap 42 having an inwardly curved portion 43 overlying the spherical spring pressed cap 31. A packing washer 44 is received between the members to act as sealing means. Additional openings 45 may be provided in the rim of the dust cap and the drum to permit the escape of oil which may be outwardly directed by the deflector 46. It should be noted that the deflector extends to closely surround the inner end of the flange 34 of the housing in order to prevent any oil from leaking onto the internal gripping surface of the brake drum. Spring pressed packing means is indicated at 47 between the relatively rotatable sleeve 21 and annular flange 34 and is used to reduce the leakage of lubricant to a negligible amount.

A ring 48 is secured to the housing 16 and has an inner annular flange closely fitting the shaft. The flange is preferably formed with a screw thread on its inner surface which tends to force the lubricant towards the cavity 49 from which it seeps back into the housing 16 through the opening 50.

The forward end of sleeve 21 has formed on its outer surface a left-hand spiral 51 which meshes with a corresponding internal spiral 52 on sleeve 53. The sleeve 53 is therefore laterally movable with respect to the sleeve 21 and the drum. In Figure 1, the sleeve 53 is illustrated in its normal running position stopped from further rearward movement by a flange of the sleeve 21. Upon the exterior of the sleeve 53 is a right-hand spiral 54 in meshing engagement with a corresponding internal spiral 55 on a brake operating sleeve 56. The sleeve 56 has at its forward end a stop flange 57, which, in the normal position shown, abuts against the ends of the sleeve 53 and sleeve 21. The brake operating sleeve is free to move laterally upon rotation with respect to the sleeve 21 guided by the meshing spirals, but it is also splined to the spacing sleeve 18 by the splines 20 so that it rotates with the shaft 10.

It will be readily understood that during running movement of the vehicle the sleeve 21 carrying the brake drum, the double worm sleeve 53 and the brake operating sleeve 56 will all rotate as a unit with the main power shaft 10. If it is desired to apply the brakes, the operator, by some suitable selective control will cause the internal brake shoes to expand and apply a retarding force to the brake drum 38, which causes a momentary relative rotation between the drum and the shaft. This action will cause a lateral forward movement of the brake operating sleeve 56 which takes place in one of two ways, dependent upon whether the vehicle is forwardly or rearwardly moving. Thus if the vehicle is forwardly moving, the clockwise rotation of the power shaft as viewed from the forward end, will cause the sleeve 56 and the double worm sleeve 53 to rotate as a unit relative to the sleeve 21 and the left-hand threads will cause the sleeves 56 and 53 to laterally move. If, however, the power shaft is rotating in the opposite direction, as upon rearward movement of the vehicle, the sleeve 56 alone will move forwardly while the sleeve 53 remains at the limit of its rearward movement.

The movement of the brake operating sleeve is transmitted to a lever which may be connected to the brake linkage in the manner to be described. A sleeve 59 is journaled on the sleeve 56 and bears against a ring of ball bearings 58 held in raceways between the sleeve 59 and a flange of sleeve 56. The arms 60 of a yoke member 61 bear against the sleeve 59. The yoke 61 is held by keys 62 to a transverse shaft 63 which is mounted by a bushing 64 at its outer end and a housing 65 at its inner end. The bushings are supported by the housing 16. The shaft 63 is held against axial movement by a bolt 66 engaging a groove 67, formed at the one end of the shaft. Suitable spring-pressed oil packing 68 is provided at the other end adjacent the bushing 65. To the end of the shaft 63, which extends outside of the housing 16, is fixedly secured a double arm lever 69, which may be connected to the brake linkage.

In order to provide for a quick operation the spiral turns may be so designed that substantially one turn of the main shaft will be sufficient to move the brake operating sleeve to the end of its stroke. But beside quickness of operation, it is essential that the wheel brakes be smoothly and evenly applied without undue vibration in any of the operating members of the linkage. Therefore, in the present improvements, a dash pot or stabilizer is interposed and acts to absorb the vibrations developed in the yoke member due to unevenness of the drag imparted to the brake drum. The dash pot is enclosed within the housing or casing 16 whereby the lubricant within the casing acts as the resistance medium.

Integral with the yoke 61 is formed a downwardly extending arm 70 provided with a rounded end 71. The casing 16 is formed to support a dash pot cylinder 72 which is held in place by the threaded head 73. Within the dash pot cylinder is freely slidable a piston 74 having a central opening to receive the rounded end 71 of the operating arm 70. Valve passages 75 are formed in each end of the piston and are normally held closed by balls 76 and springs 77. It will be readily understood that upon an operation of the power brake the piston will be moved to the right in Figure 1, and, therefore, the lubricant at the head end will be under pressure since the valve at that end will be held closed while the valve at the opposite end will open and allow lubricant to freely pass behind the piston. The piston is designed to loosely fit its cylinder or very small return grooves may be cut in the walls of the cylinder or piston to allow leakage of the lubricant around the piston and permit its forward movement. The rate at which the piston is permitted to move may be adapted to the particular conditions of use.

The lever 78 pivotally supported by the housing 16 is suitably connected to effectuate movement of the brake shoes selectively under the control of the operator.

The construction of the drive connections from the power brake unit to the differential housing will be more apparent from the detail views of Figures 3 and 4 taken in connection with a portion of the drive connection illustrated in Figure 1. The spindled end 29 forms an extension of the tubular drive shaft 79. The spindled end 29 is longitudinally slidable in but non-rotative with respect to the socketed portion 32 of the yoke 28. The sliding connection, as will be apparent in Figure 3, is enclosed by the sleeve 30 which constitutes an oil housing. The sleeve 30 rearwardly extends to a channeled portion 80 which encloses packing 81 and prevents the leakage of oil. Oil may be induced by the removal of the oil screw 82 which closes an opening of the sleeve housing 30. The tubular drive shaft 79 extends to the rear end connection and is secured by the bolts 83 to the shaft portion 84 of a yoke 85 having yoke arms 86 connected by universal joint connection 87 to the yoke 88. The sleeve 89 of the yoke 88 is splined to the end 90 of a stub shaft 91 and is held thereto by the nut 92 and the washer 93. The stub shaft extends into the differential housing 94 and has secured to its inner end a beveled pinion gear 95, which is fastened by the nut 96. The differential housing is of the usual type and includes oil sealing means 97 surrounding the sleeve 89 of the yoke 88.

Fastened to the sleeve 89 is a part of the housing for enclosing the universal joint which comprises a member 98 having a circular flange 99 to which is attached, by bolts 100, the other part 101 of the housing. The housing member 101 is generally similar to housing member 43 which encloses the forward universal joint connections and holds a packing 102 which is pressed into sealing engagement with the spherical end 103 of the cap member 104. The cap 104 is pressed toward the forward end by the spring 105. Between the spring 105 and the inner surface of the spherical end 103 is a packing 106 to prevent the leakage of oil. An oil duct 107 is formed in the yoke 85 and has its inlet opening extending into the universal joint housing closed by the screw 109.

In assembly of the power brake unit with the power shaft 10 projecting from the transmission casing 15 and the speedometer worm 11 in place, the thrust bearing 12 is first inserted in the opening of the transmission housing. A splined sleeve 18 is next slipped onto the shaft 10 and keyed in place abutting the rear of the thrust bearing 12. A bearing retainer ring 13 is next placed in position and pinned in place. The brake casing 16 is now assembled with the brake drum and the connected sleeve 21. This will permit the intermediate double worm sleeve 52 to be threaded onto the sleeve 21 together with a brake operating sleeve 56. The yoke member 61 may then be assembled through the back of the brake casing 16 and held in place by the insertion of the rock shaft 63 together with the bushing 64 and 65. The thrust ring 59, together with the roller bearing unit 58, is then assembled. Next the dash-pot cylinder together with the piston 74 is secured to the brake casing 16 in a position to receive the lower arm 70 of the yoke member. The entire brake unit may then be assembled onto the power shaft and the brake casing bolted to the transmission casing 15.

The final step consists in the insertion of the universal yoke 22 and the thrust bearing 27, which is drawn in place by the nut 26 threaded onto the end of the power shaft. After the assembly of the power brake unit to the transmission casing, the brake operating lever 69 may be keyed to the outwardly extending end of the rock shaft 63 and the stud 66 threaded in place to hold the rock shaft 63 against longitudinal movement.

It will be apparent that the construction described permits an efficient installation of a power brake unit in the power drive construction of the vehicle. The brake drum itself forms part of the housing for the forward universal joint connection. It is only necessary to use one thrust bearing in the power brake assembly since the thrust is taken up at the forward end by the speedometer connection. The spring-pressed closure of the universal joint housing provides simplified oil sealing means.

I claim—

1. In combination, a power shaft, a brake drum mounted on said power shaft, a universal joint connection in said power shaft adjacent to said brake drum, and a cover secured to said brake drum enclosing said universal joint, said cover having a spherically shaped end arranged to cooperate with a spring-pressed sleeve on said power shaft to form a dustproof housing.

2. In combination, a power shaft, a brake drum mounted on said power shaft, a universal joint connection in said power shaft adjacent to said brake drum, a cover secured to said brake drum enclosing said universal joint, a sleeve slidable on said power shaft, and a spring pressing said sleeve away from said brake drum, said cover and sleeve having cooperating ends designed to form a housing enclosing said universal joint.

3. In combination, a power shaft, a brake drum mounted on said power shaft, a universal joint connection in said power shaft adjacent to said brake drum, a cover secured to said brake drum enclosing said universal joint, a sleeve slidable on said power shaft, a spring pressing said sleeve away from said brake drum, said cover and sleeve having cooperating ends designed to form a housing enclosing said universal joint, and a packing ring held between said cooperating ends to prevent the entrance of dust.

4. In combination, a power shaft, a brake on the power shaft, a brake operating sleeve longitudinally slidable on said shaft, a rock shaft transverse to said power shaft and mounted below the same, a yoke member having upwardly extending arms adapted to engage said sleeve and a depending arm adapted to engage a dashpot plunger, said yoke member being keyed to said rock shaft, and a brake lever mounted on the end of said rock shaft.

5. In combination, a power shaft, a primary brake mounted on said power shaft, said primary brake comprising a normally rotatable but retardable brake drum, a sleeve positively driven through said power shaft and connected to said brake drum to be relatively displaceable upon retardation of said brake drum, a brake casing enclosing said power shaft and said sleeve, a rock shaft mounted in said casing transverse to said power shaft and below the same, said casing enclosing at its lower portion a slidable dashpot plunger, a yoke member keyed to said rock shaft, said yoke member having upwardly extending arms adapted to engage said sleeve and a depending centrally disposed arm adapted to engage said dashpot plunger, one end of said rock shaft extending outside of said casing, and a brake lever mounted on said outwardly extending end.

6. In combination, a power shaft, a transmission casing, a speedometer connection within said transmission casing, a ball bearing mounted on said power shaft in an opening of said transmission casing in abutting relation with said speedometer connection, a brake casing associated with said transmission casing to form a lubricant containing housing, and a retainer ring for said ball bearing held in place by said brake casing.

7. In combination, a vehicle propeller shaft, a transmission housing from which said propeller shaft extends, a casing mounted adjacent said transmission housing forming a lubricant housing and enclosing a portion of said propeller shaft, said casing having a substantially large opening in the side adjacent the transmission housing, a rock shaft pivotally supported by the walls of said casing transverse to said propeller shaft, and a yoke member adapted to be assembled through the large open end of said casing and having an opening to receive said transverse shaft, said yoke member being non-rotatably secured to said shaft.

8. In combination, a vehicle propeller shaft, a transmission housing from which said propeller shaft extends, a casing mounted adjacent said transmission housing forming a lubricant housing and enclosing a portion of said propeller shaft, said casing having a substantially large opening in the side adjacent the transmission housing, a rock shaft pivotally supported by the walls of said casing transverse to said propeller shaft, and a yoke member adapted to be assembled through the large open end of said casing and having an opening to receive said transverse shaft, said yoke member being non-rotatably secured to said shaft, a dash-pot housing associated with the lower portion of said casing, and a dash-pot piston slidable in said housing along an axis parallel to said power shaft, said yoke member including a depending arm adapted to engage said dash-pot piston.

9. In combination, a power shaft, a transmission casing, a power brake housing secured to the rear of said transmission casing, a power brake drum supported by said shaft at the rear of said power brake housing and having a hub extending thereinto, yieldable coupling means within said power brake housing for coupling said shaft to said brake drum, a universal joint connection in the power shaft adjacent the brake drum and a universal joint cover secured to the brake drum.

10. In a motor vehicle, a two-part drive shaft, a universal joint connection between the parts of said drive shaft, a housing member carried by one of the parts of said shaft and closing said universal joint and a spring-pressed sleeve on the other part of said shaft urged into sealing engagement with said housing member.

EDWARD A. ROCKWELL.